No. 653,902. Patented July 17, 1900.
T. J. BRAY.
APPARATUS FOR FORMING WELDED RINGS.
(Application filed Oct. 14, 1899.)
(No Model.)

Witnesses:

Inventor:
Thomas J. Bray
By Kay & Totten
Attorneys.

THE NORRIS PETERS CO., PHOTO-LITHO., WASHINGTON, D. C.

UNITED STATES PATENT OFFICE.

THOMAS J. BRAY, OF PITTSBURG, PENNSYLVANIA, ASSIGNOR TO THE NATIONAL TUBE COMPANY, OF SAME PLACE AND NEW YORK, N. Y.

APPARATUS FOR FORMING WELDED RINGS.

SPECIFICATION forming part of Letters Patent No. 653,902, dated July 17, 1900.

Application filed October 14, 1899. Serial No. 733,549. (No model.)

*To all whom it may concern:*

Be it known that I, THOMAS J. BRAY, a resident of Pittsburg, in the county of Allegheny and State of Pennsylvania, have invented a new and useful Improvement in Apparatus for Forming Welded Rings; and I do hereby declare the following to be a full, clear, and exact description thereof.

My invention relates to the forming of circular articles—such, for example, as rings, bands, pipe-couplings, thread-protectors, or like articles—its object being to provide apparatus for the formation of two or more such rings at one time, so as to reduce the labor and provide for the making of such articles from wide strips, which can be produced at less cost than the ordinary narrow strips or bars usually employed where each ring is made and separately welded.

The invention is applicable, though not necessarily confined, to the practice of the method set forth in an application filed by me of even date herewith, Serial No. 733,547, in which a bar formed of a series of thick portions, each corresponding in width to the rings to be formed and connected by thin webs, such as set forth in a like application, Serial No. 733,548, is first cut into blanks of suitable length for welding and then heated and welded at one operation into ring form, the present apparatus consisting in suitable hammer-dies for welding such rings or like articles having concave die-faces provided with annular projections corresponding to the depressions to be formed between the several rings and a mandrel upon which the blanks are to be welded.

To enable others skilled in the art to employ my invention, I will describe the same more fully, referring to the accompanying drawings, in which—

Figure 1:
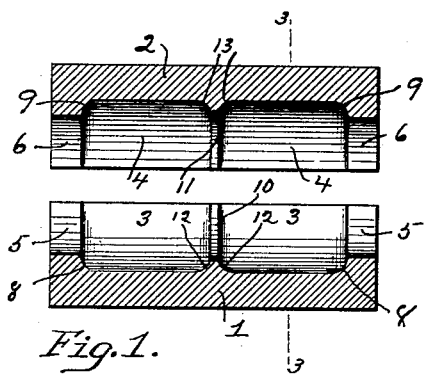
Figure 2:
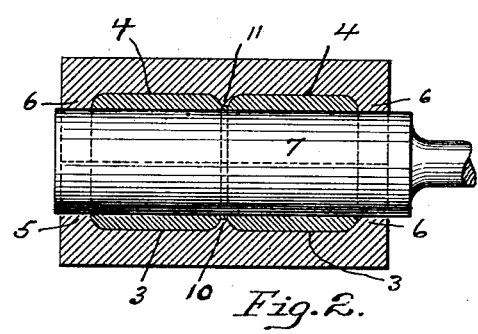
Figure 3:
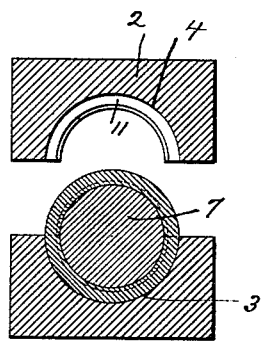
Figure 4:
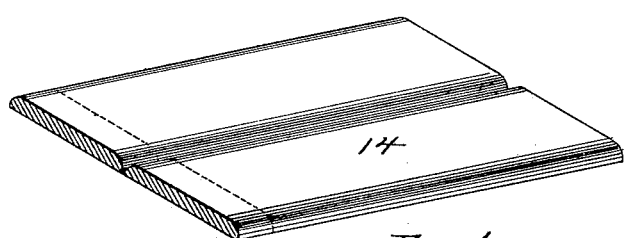
Figure 6:
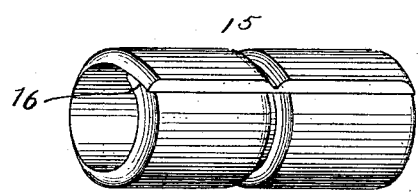
Figure 5:
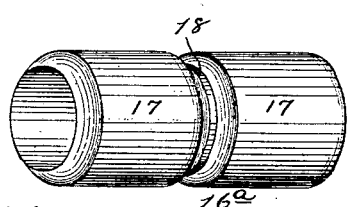
Figure 7:
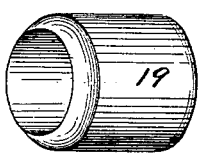

Figure 1 is a longitudinal central section of dies illustrating the invention. Fig. 2 shows such dies in the operation of welding the blanks around the mandrel. Fig. 3 is a cross-section on the line 3 3, Fig. 1, showing the blank upon the mandrel. Fig. 4 shows one form of bar suitable for welding within the dies and from which suitable blanks are cut. Fig. 5 shows such blanks bent into shape for welding. Fig. 6 shows welded blanks where they are connected by thin webs, and Fig. 7 shows one of the rings produced.

Like figures of reference indicate like parts in each.

The dies embodying the invention are composed of the lower or anvil die 1 and the upper or hammer die 2, these dies having the concave working faces 3 4, according to the number of rings to be formed at any single operation. The lower die is provided at its outer ends with the inwardly-projecting collars or flanges 5, having seats formed therein in which rests the mandrel 7, around which the blank is placed. The upper die is provided at its ends with corresponding inwardly-projecting collars or flanges 6, which as the die 2 descends and when the welding operation is completed contact with the body of the mandrel and so limit the further downward movement of the die, while the flanges or collars 5 and 6 serve to confine the metal of the blank from flowing sidewise. The inner faces of the collars 5 and 6 are curved or inclined, as at 8 9, corresponding to the desired shape to be given to the outer walls of the rings or collars to be produced. The several working faces 3 of the anvil-die are separated by the inwardly-projecting ribs 10, which may extend out either as far as the collars 5 or slightly less than the same, being of the full height of such collars where it is desired in the welding operation to sever the several rings formed from the single blank, while if the rings are to be left connected together by the thin webs the projections 10 are made shallower, so as to leave the proper space for such thin webs. In the upper or hammer die 2 like inwardly-projecting ribs 11 are formed in line with the ribs 10 and separating the working faces 4. The side faces of these ribs 10 11 are also inclined, as at 12 13, according to the desired curve or incline of the end faces of the couplings to be produced.

If it is desired to leave the rings or couplings connected, the projections 10 are made of such a height as to leave webs of substantially the thickness of ordinary screw-threads, so that when the ring or coupling is screwthreaded by means of an ordinary threading-tool the rings or couplings are separated by this operation.

In employing the apparatus above described for the making of rings or couplings the blanks are cut to suitable length, as indicated at 14, Fig. 4, and then are bent into skelp form, as shown at 15, Fig. 5, the edges of the blanks lapping, as at 16, so as to acquire a firm weld. The blanks are then placed within the furnace and raised to the proper welding heat, and when withdrawn from the furnace the mandrel 7 is slipped within the same and the blank is placed within the die, as shown in Fig. 2, and the mandrel rotated during the reciprocation of the hammer-die until under the several blows of the hammer the blank is welded into ring-like form and the edge faces of the several rings formed from the blank are properly finished. The blank can then be withdrawn, such blank being shown at 16ª, Fig. 6, and is composed of two rings 17, connected by a thin web 18, or the blanks can be separated in the welding thereof, one such blank being shown at 19, Fig. 7. In this way at a single operation I am enabled to produce two or more rings and to finish the end faces thereof, and the cost of the same is materially reduced, as I am enabled to employ bars of greater width which can be produced at less cost, and am enabled to finish several blanks at one operation. I also extend the relative length of life of the dies, relieving them from so great strain in the welding in proportion to the number of rings produced.

It will be observed that each concave working face of the dies is in cross-section a complete semicircle, so that the dies absolutely confine the metal against radial flow, thereby preventing enlargement of the rings or couplings, while at the same time the end flanges on the dies prevent lateral flow of the metal. The dies disclosed therefore form rings and couplings in which the joints are firmly welded, which are properly shaped and finished, and which are all of absolutely-uniform size.

What I claim as my invention, and desire to secure by Letters Patent, is—

1. In apparatus for welding and shaping rings or like articles, the combination of a mandrel corresponding in diameter to the interior of the ring to be formed, and hammer-dies having two or more concave working faces each corresponding in shape to one of the rings to be formed, inwardly-projecting flanges or collars at the ends of each die adapted to contact with the mandrel and confine the blank, and inwardly-projecting ribs intermediate the working faces of the dies adapted to shape the end faces of the rings.

2. In an apparatus for welding and shaping rings, or like articles, the combination of a mandrel corresponding in diameter to the interior of the ring to be formed and hammer-dies having two or more concave working faces, each corresponding in shape to one of the rings to be formed, inwardly-projecting flanges or collars at the ends of each die and inwardly-projecting ribs intermediate the working faces of the dies adapted to shape the end faces of the rings, said ribs being of such height as to leave a web between the rings of substantially the thickness of the depth of screw-threads.

In testimony whereof I, the said THOMAS J. BRAY, have hereunto set my hand.

THOMAS J. BRAY.

Witnesses:
GRACE C. RAYMOND,
ROBERT C. TOTTEN.